Nov. 8, 1938.  A. DUKELOW ET AL  2,135,971
CLUTCH
Filed Aug. 24, 1937  2 Sheets-Sheet 2
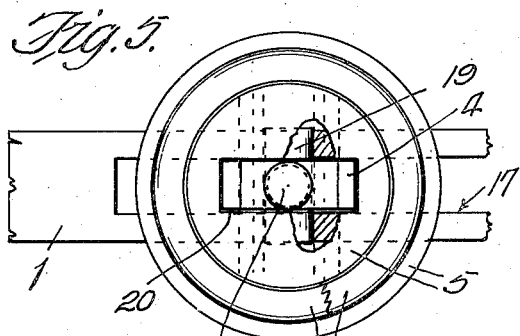
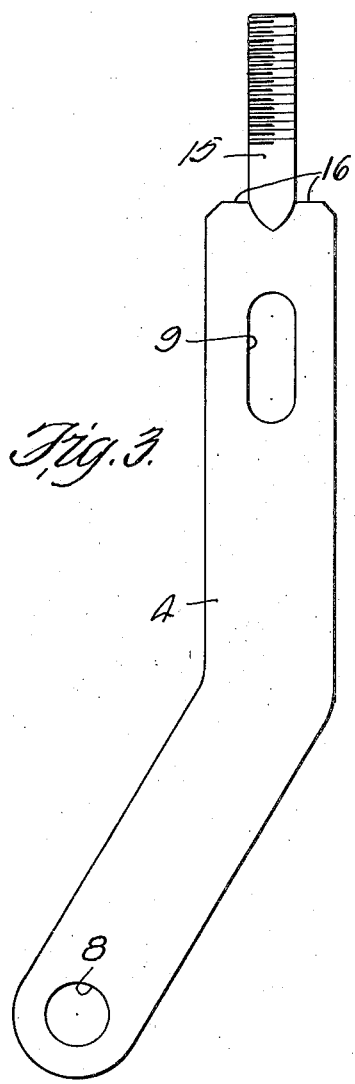
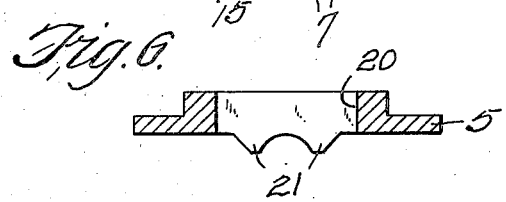
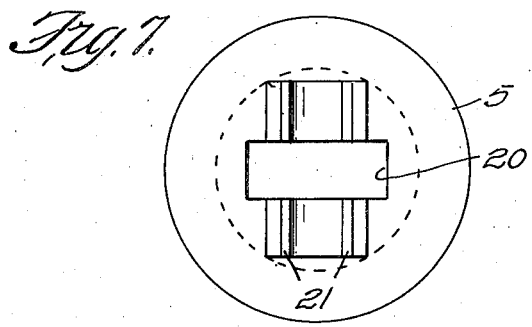
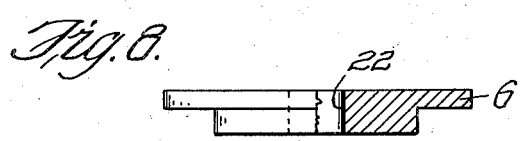
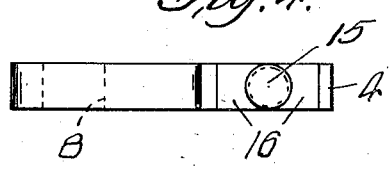
Arthur Dukelow,
Lee M. Alger,
INVENTORS.
BY Fredk J. Larson
ATTORNEY.

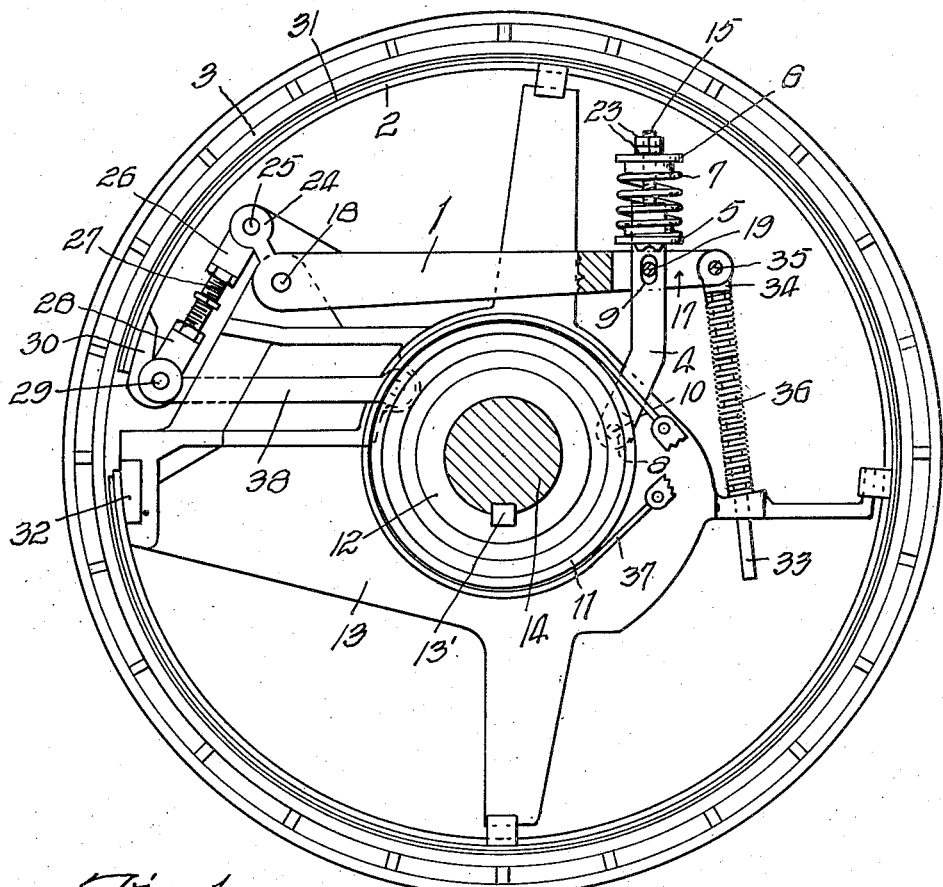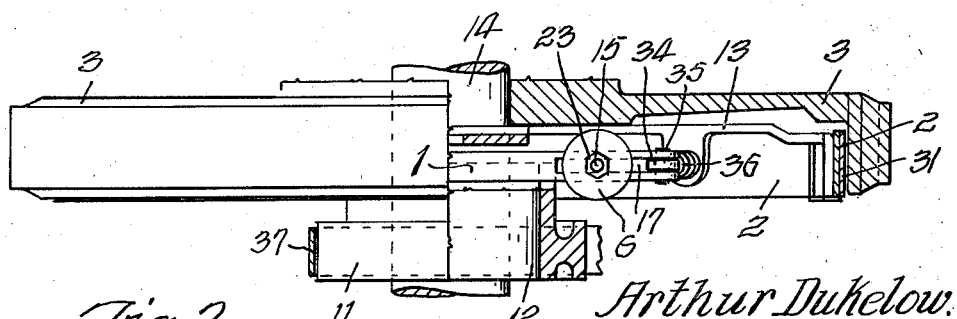

Patented Nov. 8, 1938

2,135,971

UNITED STATES PATENT OFFICE 2,135,971

CLUTCH

Arthur Dukelow, Denver, and Lee M. Alger, Golden, Colo.

Application August 24, 1937, Serial No. 160,654

3 Claims. (Cl. 192—77)

The present invention relates to clutches, and, more particularly to hoist shaft clutch mechanism for the control of the lever arm which actuates the hoist shaft clutch band assembly used in connection with power shovels, and, still more particularly to a clutch employed with the left hand hoist drum in a power shovel having a crowd boosting mechanism, as disclosed in our co-pending application Serial Number 155,637, filed July 26th, 1937.

The invention has for its primary object to provide, in a manner hereinafter set forth, a mechanism for lever arm control of the hoist shaft clutch band comprising a novel construction, combination and arrangement of parts through the medium of which the clutch band is expeditiously and uniformly expanded to grip the clutch drum associated with a hoist cable drum so as to produce a smooth and gentle action of the clutch band and which is very positive when completely engaged with the clutch drum so as to prevent chatter when setting under the most severe excavating conditions.

Another important object of the invention is to provide a clutch band lever arm control mechanism which will cause a clutch to pick up the load with a smooth non-chattering effect in starting, and, which can be regulated to slip under excessive over-load.

A further object of the invention is the provision of a clutch band lever arm control for power shovels, which will respond instantly and which will eliminate shocks and strains to a machine caused by excessive over-loads.

Other objects of the invention are to provide a mechanism or device of the character aforementioned which will be comparatively simple in construction, strong, durable, efficient and reliable in use, compact, and which may be manufactured at low cost, as well as readily applicable to hoist drum shaft clutches in the present types of power shovels.

All of the foregoing and still further objects and advantages of the invention will become apparent from a study of the following specification, taken in connection with the accompanying drawings.

Referring to the accompanying drawings forming a part of this specification, wherein like characters of reference denote similar parts throughout the several views:

Fig. 1 is a side elevation of a hoist drum clutch embodying the features of the present invention, parts thereof being in cross-section. The clutch band is shown released.

Fig. 2 is a view, partly in top plan and partly in horizontal sectional elevation.

Fig. 3 is a detail in side elevation of the spacer arm.

Fig. 4 is a top plan view of the spacer arm.

Fig. 5 is a plan fragmentary view of the lever arm, spacer arm, the bottom spring seat member and the spring, the top spring seat member being removed.

Fig. 6 is a vertical sectional view of the lower spring seat member.

Fig. 7 is a bottom plan view of the lower spring seat member.

Fig. 8 is a view partly in side elevation and partly in sectional elevation of the upper spring seat member.

Referring now to the drawings, briefly, in detail. it will be seen that the embodiment of the present invention which has been illustrated in one preferred form, comprises the usual lever arm designated, generally as 1, which arm actuates a clutch band 2 so as to engage and disengage the usual clutch drum 3; a suitably shaped spacer arm designated, generally as 4, a lower spring seat member 5, an upper spring seat member 6, and a suitable compression spring 7, which is interposed between said seat member with the first mentioned seat member 5 seated to ride upon the lever arm 1.

As more clearly shown in detail, the spacer arm 4 is preferably angular in side elevation. The arm is provided with an opening 8 near its lower end, and a longitudinal slotted opening 9 near the upper end of the arm. The spacer arm 4 is mounted at its apertured inner end on a pin 10 secured to a synchro brake band housing 11 which is mounted on the hub 12 of a clutch spider 13 and the hub is suitably keyed, as at 13' to a driven hoist drum shaft 14. The spider 13, it will be observed, in one embodiment thereof, is rotatable within the clutch drum 3, as an internal type of clutch is illustrated, although the invention is applicable to the external type of clutch if so desired. A suitable externally screw-threaded shank, or stem 15 projects outwardly from the outer end of the spacer arm 4, and, it is preferably of a diameter equal to the thickness of the spacer arm 4 so as to provide shoulders 16 on the outer end of the spacer arm adjacent the base of the screw-threaded stem 15.

The upper, or outer end of the spacer arm 4, which is provided with the slotted opening 9, passes through a slot 17 in the end of the lever arm 1 opposite the end thereof which is pivotally connected, as at 18 to the clutch spider. A pin 19 is carried by the slotted, or bifurcated end of the lever arm 1 and it passes through the slotted opening 9 in the spacer arm 4, as clearly shown in Fig. 1. The lower spring seat member 5 is provided with a central slotted opening 20 through which the upper end of the flat spacer arm passes. The lower face of the spring seat member 5 is provided with suitable pads 21 which engage and ride on the bifurcated ends of the lever arm 1. The compression spring 7 is seated upon the lower spring seat member 5 and it encircles the upper end of the spacer arm and the screw-threaded stem 15 thereof, which stem passes upwardly therethrough and through a central opening 22 in the upper spring seat member 6 which is seated upon the upper end of the compression spring 7. The screw-threaded stem 15 is provided with suitable locking devices, such as nuts 23, for adjusting the tension of the spring 7 which changes the positions of the ends of the slotted opening in the spacer arm with relation to the center of the pin 19 carried by the lever arm 1, as desired by the operator.

The lever arm 1, as usual, is provided with a live offset portion, or head 24, which is pivotally connected, as at 25, to a clevis 26, having connection with one end of an adjusting screw 27. The opposite end of the adjusting screw 27 is connected with a clevis 28 which is pivotally connected as at 29, to the live end 30 of the hoist shaft clutch band which is provided with the usual clutch lining 31. The dead end 32 of the clutch band is suitably anchored in the usual manner to the clutch spider 13.

There is a spring rod 33 having a head 34 pivotally connected, as at 35, to the bifurcated end of the lever arm 1 and this rod is slidably connected at its opposite end to a boss on the clutch spider 13. There is a suitable release spring 36 encircling the spring rod 33 and engaging the spider boss at its lower end and the head 34 of the spring rod 33 at its opposite end.

The setting of a synchro band 37, in the usual manner, is not believed necessary to further illustrate or describe, as it forms no part of the present invention. It causes a brake housing 11 to momentarily rotate clockwise relative to the clutch, causing the usual connecting rod 38 pivotally connected to the live end of the clutch band and to the spider 13, to swing and the spacer arm to operate the lever arm 1, which pulls on the live end of the clutch band and consequently sets the clutch. The spring 36 is the release spring, as described, and releases the clutch band in the usual manner, assisted by the compression spring 7 mounted above the bifurcated end of the lever arm 1.

The relatively short, heavy and stiff compression spring 7 operating in association with the lever arm 1, the spacer arm 4 and release spring 36 adds boosting power to the lever arm 1 over that delivered by the release spring 36 and by the use of the present invention in connection with the usual clutch setting and releasing mechanism results in a smoother, more positive and a quicker hoist clutch with no chatter present during the most severe excavating condition and particularly when a power shovel is equipped with our invention disclosed in the application previously referred to.

The many advantages of the herein described invention will readily suggest themselves to those skilled in the art to which the invention relates.

From the foregoing description, it is evident that a simple device for this purpose has been disclosed, but it is to be understood that we do not desire to restrict, or limit ourselves to the very details of the construction shown and described, which is merely illustrative, it being obvious that changes, not involving the exercise of invention, may be made without conflicting or departing from the spirit of the invention within the scope of the appended claims.

What we claim is:

1. A clutch having, in combination, a lever arm connected at one end to the live end of a clutch band, said lever arm having a bifurcated opposite end, a spacer arm pivotally mounted at one end, the opposite end of said spacer arm passing through the bifurcated end of the lever arm, a pin carried by the bifurcated end of the lever arm and passing through a slotted opening in the spacer arm, a spring seat member seated on the bifurcated end of the lever arm with the upper end of the spacer arm passing through a slotted opening in the spring seat member, a screw-threaded stem projecting upwardly from the free end of the spacer arm, a compression spring seated upon said spring seat member, a second spring seat member mounted on the outer end of the spring and having an opening therein through which the screw threaded stem passes, and an adjusting nut carried by the second spring seat member and engaging said member.

2. In combination with a lever arm, a spring rod and a release spring therefor, of a pivotally supported angular spacer arm passing upwardly through a slot in one end of the lever arm, a lower spring seat member having a slot for the spacer arm to pass through and seated on the lever arm, a compression spring seated on the spring seat member, an upper spring seat member mounted on the spring, a screw-threaded stem projecting upwardly from the spacer arm and passing through an opening in the upper spring seat member, and securing nuts carried by the screw threaded stem for adjusting the tension of the spring.

3. A clutch having, in combination, a pivoted supported lever arm connected at one end to the live end of a clutch band and having its free end bifurcated, a spacer arm pivotally supported at its inner end and having its free end projecting through the bifurcated end of the lever arm, a pin and slot connection between the bifurcated end of the lever arm and the spacer arm, a screw-threaded stem projecting from the free end of the spacer arm, nuts carried by the screw-threaded stem, and an adjustable yieldable connection including spaced seats and a compression spring surrounding the free end of the spacer arm and the screw-threaded stem and disposed between the bifurcated end of the lever arm and said nuts.

ARTHUR DUKELOW.
LEE M. ALGER.